(12) United States Patent
Kagami et al.

(10) Patent No.: US 11,462,793 B2
(45) Date of Patent: Oct. 4, 2022

(54) BATTERY CASE STRUCTURE FOR VEHICLE

(71) Applicant: Toyota Jidosha Kabushiki Kaisha, Toyota (JP)

(72) Inventors: Ayaka Kagami, Inazawa (JP); Yasuhide Matsuo, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 440 days.

(21) Appl. No.: 16/715,442

(22) Filed: Dec. 16, 2019

(65) Prior Publication Data
US 2020/0194752 A1    Jun. 18, 2020

(30) Foreign Application Priority Data

Dec. 18, 2018 (JP) .............................. JP2018-236609

(51) Int. Cl.
*H01M 50/00* (2021.01)
*H01M 50/20* (2021.01)
*B60K 1/04* (2019.01)

(52) U.S. Cl.
CPC .............. *H01M 50/20* (2021.01); *B60K 1/04* (2013.01); *H01M 2220/20* (2013.01)

(58) Field of Classification Search
CPC ... H01M 2220/20; H01M 50/22; Y03E 60/10; B60K 1/04; B60K 2001/0438; Y02E 60/10
See application file for complete search history.

(56) References Cited

U.S. PATENT DOCUMENTS

| RE44,994 E | 7/2014 | Rawlinson et al. |
| 2006/0109610 A1* | 5/2006 | Liu ....................... H02J 7/0045 361/600 |
| 2010/0136402 A1 | 6/2010 | Hermann et al. |
| 2010/0273034 A1 | 10/2010 | Hermann et al. |
| 2011/0174556 A1 | 7/2011 | Hermann et al. |
| 2012/0160088 A1 | 6/2012 | Rawlinson |
| 2012/0160583 A1 | 6/2012 | Rawlinson |
| 2012/0161429 A1 | 6/2012 | Rawlinson et al. |
| 2012/0161472 A1 | 6/2012 | Rawlinson et al. |
| 2012/0231306 A1 | 9/2012 | Herron et al. |
| 2012/0237803 A1 | 9/2012 | Mardall et al. |

(Continued)

FOREIGN PATENT DOCUMENTS

| CN | 106123437 A | 11/2016 |
| CN | 206322750 U | 7/2017 |
| JP | 2012-131486 A | 7/2012 |

*Primary Examiner* — Cynthia H Kelly
*Assistant Examiner* — Monique M Wills
(74) *Attorney, Agent, or Firm* — Dinsmore & Shohl LLP

(57) ABSTRACT

The vehicle battery case structure includes a top plate and a bottom plate, a side plate provided around the bottom plate, a partition plate provided in a lattice shape on the top surface of the bottom plate to form a plurality of regions for accommodating the battery pack with the side plate, a slit portion into which the side plate and the partition plate can be inserted, and a fixing portion to which the top plate is fixed, and a fastening member bonded to the top surface of the bottom plate at the intersection of the side plate and the partition plate and at the intersection of the partition plates in a state in which at least one of the side plate and the partition plate is inserted into the slit portion.

16 Claims, 14 Drawing Sheets

(56) References Cited

U.S. PATENT DOCUMENTS

| | | |
|---|---|---|
| 2012/0308858 A1 | 12/2012 | Hermann et al. |
| 2012/0308859 A1 | 12/2012 | Hermann et al. |
| 2012/0312615 A1 | 12/2012 | Rawlinson |
| 2013/0088044 A1 | 4/2013 | Charbonneau et al. |
| 2013/0088045 A1 | 4/2013 | Charbonneau et al. |
| 2013/0153317 A1 | 6/2013 | Rawlinson et al. |
| 2014/0182958 A1 | 7/2014 | Rawlinson et al. |
| 2014/0193683 A1 | 7/2014 | Mardall et al. |
| 2015/0239331 A1 | 8/2015 | Rawlinson et al. |
| 2018/0334022 A1 | 11/2018 | Rawlinson et al. |

\* cited by examiner

BATTERY CASE STRUCTURE FOR VEHICLE

CROSS-REFERENCE TO RELATED APPLICATION

This application is based on and claims priority under 35 USC 119 from Japanese Patent Application No. 2018-236609 filed on Dec. 18, 2018, the disclosure of which is incorporated by reference herein.

TECHNICAL FIELD

The present disclosure relates to a battery case structure for a vehicle.

RELATED ART

A battery pack mounting structure in which a side member is provided around a bottom plate on which a battery pack is mounted, a cross member for partitioning a storage space of the battery pack is provided on an upper surface of the bottom plate, and a top plate is mechanically coupled to the cross member and the upper surface of the side member by a bolt or the like is conventionally known (for example, see Japanese Patent Application Laid-Open No. 2012-131486 (Patent Document 1)).

In such a structure, a fastening member, such as a nut, for attaching the top plate to the side member and the cross member is provided. However, in such a structure, a positional deviation may occur between the fastening member provided on the side member and the cross member and the through hole for insertion of the bolt formed in the top plate. In such a case, it becomes difficult to attach the top plate. Thus, there is a room for improvement in the structure for suppressing the positional deviation of the fastening member when attaching the top plate.

SUMMARY

It is therefore an object of the present disclosure to provide a vehicle battery case structure capable of suppressing positional deviation of a fastening member when attaching a top plate.

The vehicle battery case structure according to the first aspect includes: a top plate; a bottom plate; a side plate provided around the bottom plate; partition plates provided in a lattice pattern on the upper surface of the bottom plate and forming, with the side plate, plural regions for accommodating a battery pack; and a fastening member having a slit portion into which the side plate and the partition plate can be inserted and a fixing portion to which the top plate is fixed, and being bonded to an upper surface of the bottom plate at an intersecting position between the side plate and the partition plate and at an intersecting position among the partition plates in a state in which at least one of the side plate and the partition plate is inserted into the slit portion.

According to the first aspect, the fastening member is fastened to the upper surface of the bottom plate at the intersecting position between the side plate and the partition plate and at the intersecting position among the partition plates in a state in which at least one of the side plate and the partition plate is inserted into the slit portion. That is, the side plates and the partition plates are positioned by the fastening members, and consequently the fastening members are positioned with respect to the side plates and the partition plates. Therefore, positional deviation of the fastening member when attaching the top plate is suppressed.

The vehicle battery case structure according to the second aspect is the vehicle battery case structure according to the first aspect, wherein the side plate and the partition plate inserted into the slit portion are respectively bonded to the slit portion.

According to the second aspect, the side plate and the partition plate inserted into the slit portion are each bonded to the slit portion. Therefore, as compared with the case where the side plate and the partition plate inserted into the slit portion are not bonded to the slit portion, warping and twisting of the side plate and the partition plate are corrected.

The vehicle battery case structure according to the third aspect is the vehicle battery case structure according to the first or second aspect, wherein the bottom plate includes plural unit members extending in the vehicle width direction and being arranged in the vehicle body front-rear direction, each unit member having a bonding portion in which one end portion and the other end portion of a mutually facing bonding portions are bonded to each other.

According to the third aspect, the bottom plate is configured by arranging plural unit members extending in the vehicle width direction in the vehicle body front-rear direction and bonding one end and the other end facing each other. That is, the size of the bottom plate can be changed by changing the number of unit members in accordance with the number of battery packs to be mounted. Therefore, the degree of freedom with respect to the mounting amount of the battery pack can be increased.

The vehicle battery case structure according to the fourth aspect is the vehicle battery case structure according to the third aspect, wherein the partition plate extending in the vehicle width direction is formed integrally with the unit member.

According to the fourth aspect, the partition plate extending in the vehicle width direction is formed integrally with the unit member. Therefore, the rigidity of the partition plate is improved as compared with the case where the partition plate extending in the vehicle width direction is not formed integrally with the unit member.

The vehicle battery case structure according to the fifth aspect is the vehicle battery case structure according to the third or fourth aspect, wherein a reinforcing portion extending in the vehicle width direction is formed on the lower surface of the unit member.

According to the fifth aspect, a reinforcing portion extending in the vehicle width direction is formed on the lower surface of the unit member. Therefore, the strength and rigidity of the bottom plate are improved.

The vehicle battery case structure according to the sixth aspect is the vehicle battery case structure according to any one of the third to the fifth aspect, wherein the mutually facing bonding portions of the unit members are each formed in a staircase shape, such that the staircase shapes of mutually facing bonding portions are arranged symmetrically in a vertical direction.

According to the sixth aspect, the mutually facing bonding portions of the unit members are each formed in a staircase shape such that, the staircase shapes of mutually facing bonding portions are arranged symmetrically in a vertical direction. Therefore, the bonding portions can be bonded to each other easily.

The vehicle battery case structure according to the seventh aspect is the vehicle battery case structure according to any one of the first to the sixth aspect, wherein the fastening member in which the side plate is inserted into the slit portion includes a flat surface in which the slit portion is not formed on a side surface in which the side plate or the partition plate is not inserted.

According to the seventh aspect, the fastening member in which the side plate is inserted into the slit portion is formed by a flat surface in which the slit portion is not formed on a side surface in which the side plate or the partition plate is not inserted. Therefore, entry of rainwater, foreign matter, or the like into the slit portion can be prevented as compared with the case where the slit portion is present in which the side plate or the partition plate is not inserted.

The vehicle battery case structure according to the eighth aspect is the vehicle battery ease structure according to any one of the first to the seventh aspect, further including a second fastening member inserted into an intermediate portion of the partition plate in the vehicle width direction.

According to the eighth aspect, a second fastening member is inserted into an intermediate portion of the partition plate in the vehicle width direction. Therefore, According to this, since the bonding strength of the partition plate bonded to the upper surface of the bottom plate in the intermediate portion in the vehicle width direction is improved, warpage and twist of the partition plate can be further corrected. Since the second fastening portion of the top plate to the bottom plate can be increased, it is possible to suppress the rigidity reduction of the top plate.

The vehicle battery case structure according to the ninth aspect is the vehicle battery case structure according to any one of the first to the eighth aspect, further including a third fastening member provided on the upper surface of the bottom plate in a region in which the battery pack is not accommodated in the region formed by the side plate and the partition plate.

According to the ninth aspect, a third fastening member is provided on the upper surface of the bottom plate in a region in which the battery pack is not accommodated in the region formed by the side plate and the partition plate. Therefore, when not the battery pack but the accessories and the like (not shown) are accommodated in one of the plural regions, the third fastening portion can be provided therein so as to strengthen the fastening of the top plate to the bottom plate, and it is possible to suppress the rigidity reduction of the top plate.

As described above, according to the present disclosure, it is possible to suppress positional deviation of the fastening member when attaching the top plate.

DETAILED DESCRIPTION

Hereinafter, embodiments of the present disclosure will be described in detail with reference to the drawings. For convenience of description, the arrow UP, the arrow FR, and the arrow RH shown as appropriate in each drawing are defined as the upward direction of the vehicle body, the forward direction of the vehicle body, and the rightward direction of the vehicle body, respectively. Therefore, in the following description, when the up-down, front-back, and left-right directions are described without special mention, it is assumed that the up-and-down direction of the vehicle body, the front-and-back direction of the vehicle body, the front-and-back direction of the vehicle body, and the left-and-right direction of the vehicle body (vehicle width direction) are shown.

Figure 1:
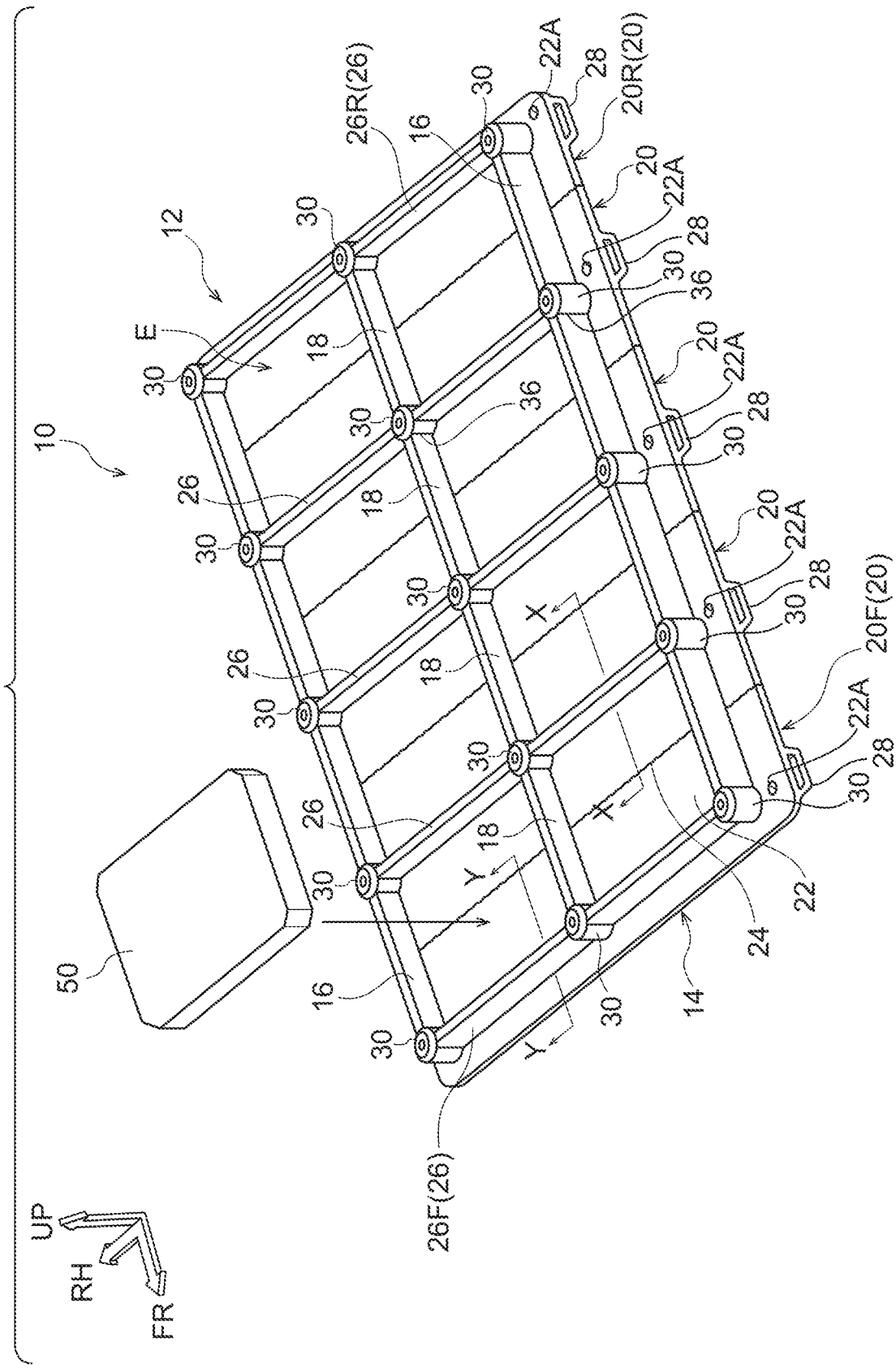
FIG. 1 is a perspective view showing a battery case structure for a vehicle excluding a top plate together with a battery pack according to the present embodiment.

As shown in FIG. 1, the vehicle battery case structure 10 according to the present embodiment is applied to a battery case 12 accommodating plural battery packs 50. The battery case 12 includes plural unit members 20 that are coupled to each other in the vehicle body front-rear direction to form the bottom plate 14. The unit member 20 is formed by extrusion molding of a light metal material such as an aluminum alloy.

Figure 2:
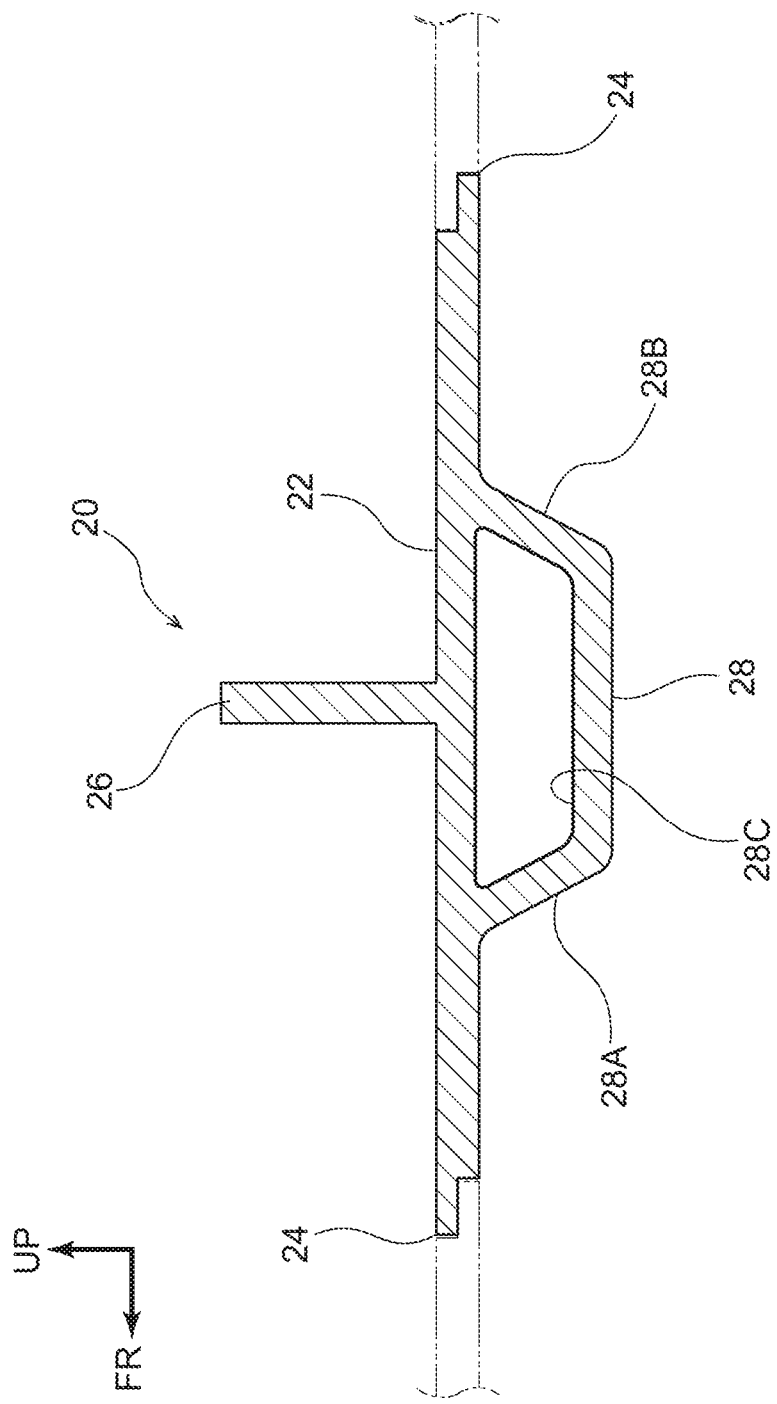
FIG. 2 is a cross-sectional view taken along the line X-X in FIG. 1 showing the unit member of the battery case structure for a vehicle according to the present embodiment.

As shown in FIG. 2, the unit member 20 has a rectangular flat plate portion 22 extending in the vehicle width direction and having a bonding portion 24 formed at the front end (one end portion) and the rear end (the other end portion) respectively, and a rectangular flat plate partition plate 26 integrally erected so as to extend in the vehicle width direction on the upper surface of the flat plate portion 22 and at the center portion in the vehicle body front-rear direction. The unit member 20 has a reinforcing portion 28 integrally formed on the lower surface of the flat plate portion 22 on the opposite side from the partition plate 26.

Figure 3:
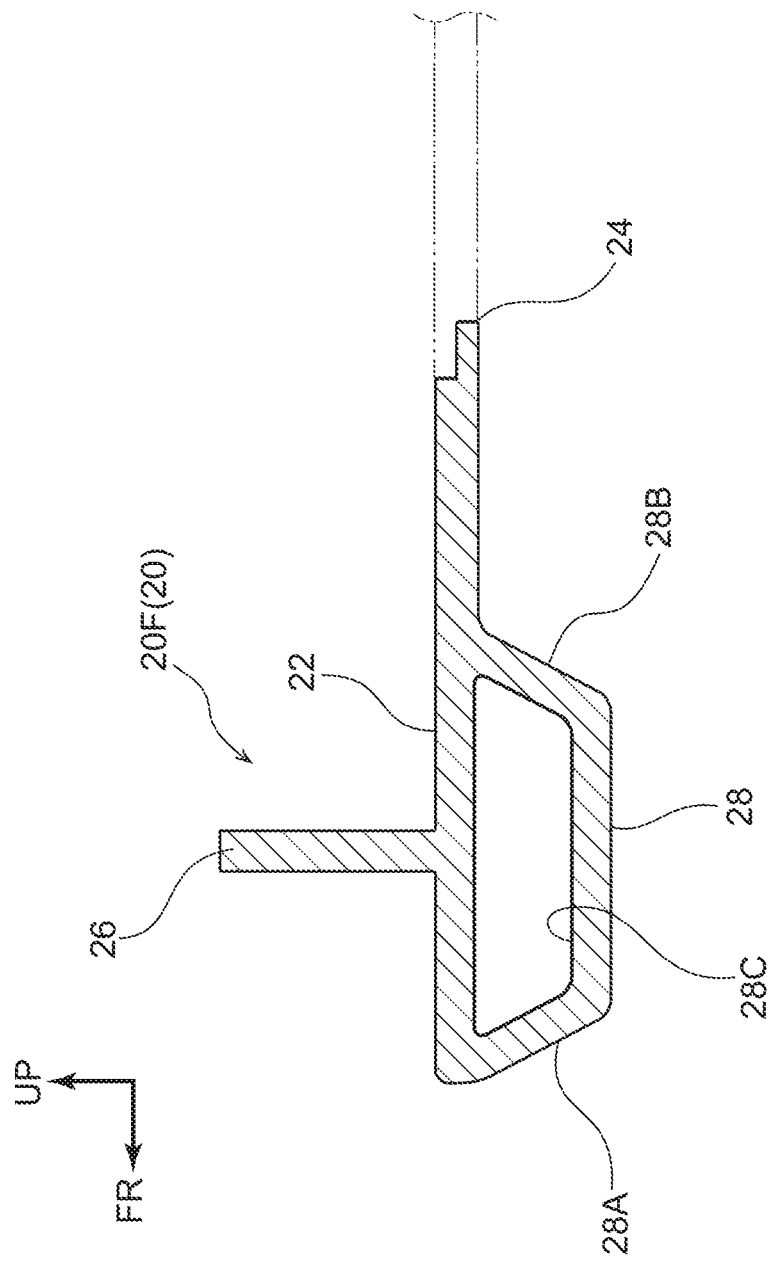
FIG. 3 is a cross-sectional view taken along the line Y-Y in FIG. 1 showing a unit member of the vehicle battery case structure according to the present embodiment.
Figure 4:
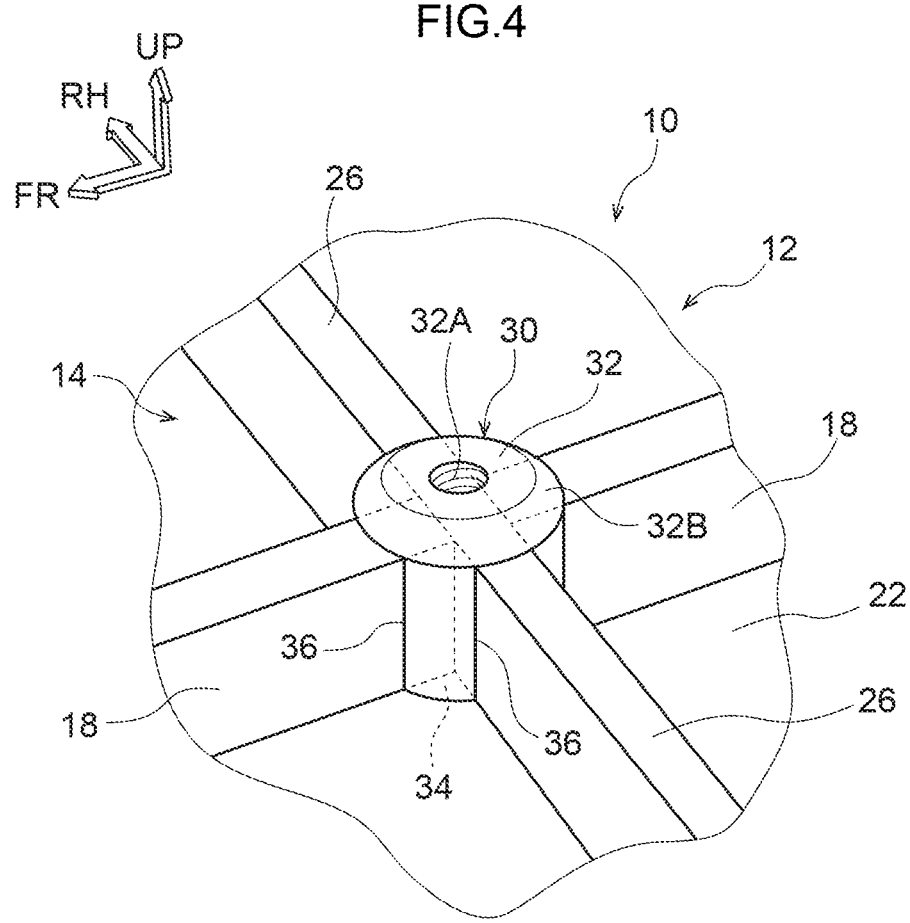
FIG. 4 is a perspective view showing a fastening member of a battery case structure for a vehicle according to the present embodiment.

As shown in FIG. 3, the unit member 20F (see FIG. 1) provided at the front end portion of the bottom plate 14 is configured by cutting a part of the flat plate portion 22 on the front side of the vehicle body with respect to the reinforcing portion 28, and the bonding portion 24 is formed only at the rear end portion of the flat plate portion 22. Similarly, the unit member 20R (see FIG. 1) provided at the rear end portion of the bottom plate 14 is configured by cutting a part of the flat plate portion 22 on the rear side of the vehicle body with respect to the reinforcing portion 28, and the bonding portion 24 is formed only at the front end portion of the flat plate portion 22.

As shown in FIGS. 2 and 3, the bonding portion 24 is formed in a stepped shape, and is formed vertically symmetrically between the vehicle body front side and the vehicle body rear side. That is, in the bonding portion 24 on the front side of the vehicle body, the upper side (upper half) projects toward the front side of the vehicle body, and in the bonding portion 24 on the rear side of the vehicle body, the lower side (lower half) projects toward the rear side of the vehicle body.

The arrangement of the unit members 20 may be reversed. That is, in the bonding portion 24 on the front side of the vehicle body, the lower side (lower half) may project toward the front side of the vehicle body, and in the bonding portion 24 on the rear side of the vehicle body, the upper side (upper half) may project toward the rear side of the vehicle body.

The plurality of unit members 20 including the unit member 20F constituting the front end portion and the unit member 20R constituting the rear end portion are arranged in the longitudinal direction of the vehicle body, and the bonding portions 24 facing each other are engaged with each other in the vertical direction and bonded to each other, thereby forming the bottom plate 14 on which the battery pack 50 is mounted (see FIG. 1).

As a bonding for bonding the bonding portions 24, for example, friction-stir welding (Friction Stir Welding: FSW) may be used, but arc welding, laser welding, or the like may also be used. In some embodiments, from the viewpoint of suppressing or preventing the entry of rainwater, foreign matter, or the like, at least the lower surface side of the bonding portion 24 may be bonded by friction stir welding (FSW) or the like.

Further, as shown in FIG. 1, both outer end portions of the partition plates 26 in each unit member 20 in the vehicle width direction are cut out by a predetermined length. That is, the length of each partition plate 26 is shorter than the length of each flat plate portion 22. On the upper surface of the bottom plate 14 outside the vehicle width direction of each partition plate 26, a pair of left and right rectangular flat plate-shaped side plates 16 extending in the vehicle body front-rear direction are provided by being bonded by a bonding such as arc welding or laser welding in a state in which they are inserted into slit portions 36 of a fastening member 30, which will be described later.

Figure 7:
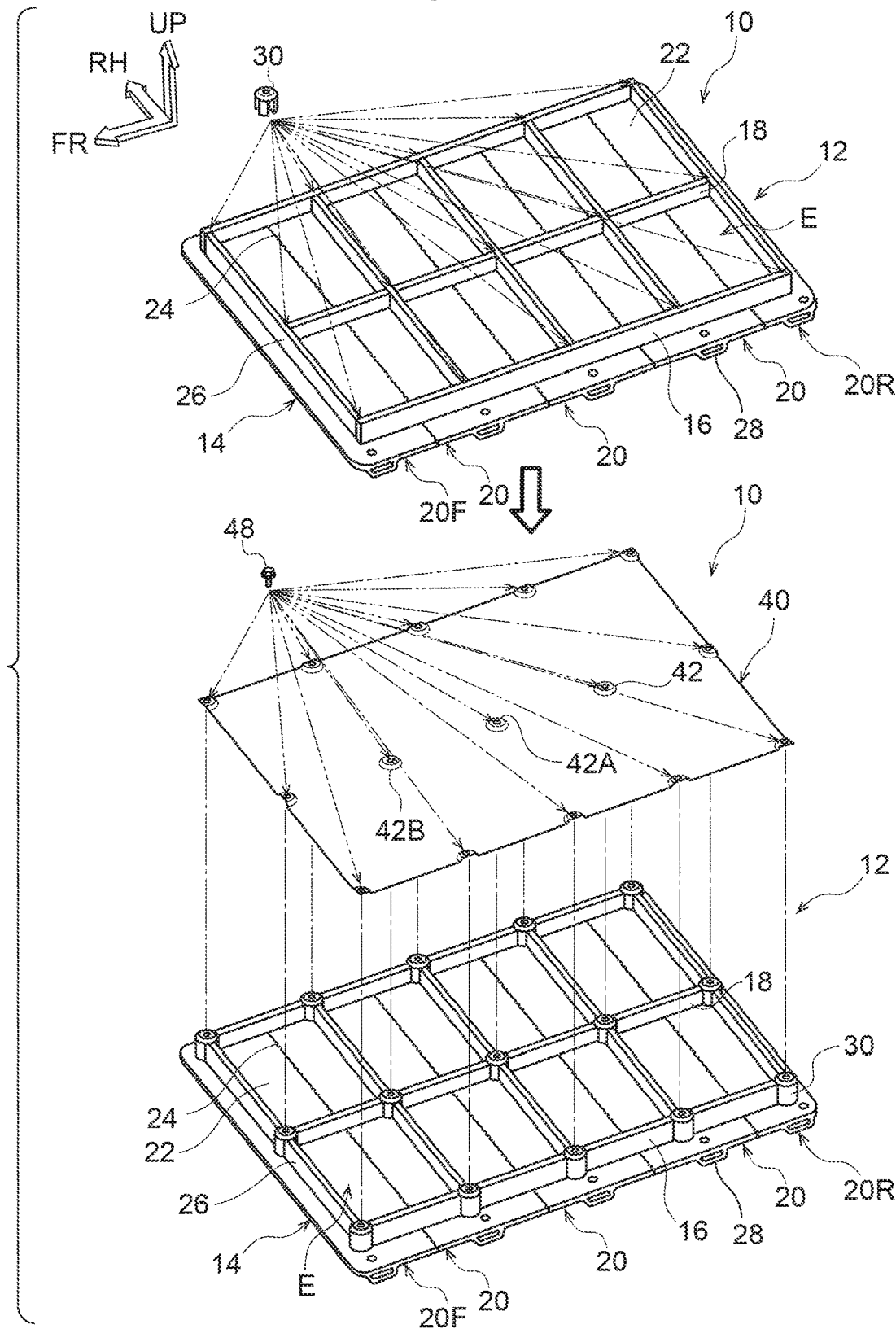
FIG. 7 is a perspective view showing a process of fastening the top plate of the vehicle battery case structure according to the present embodiment.

At this time, the inner surface of each side plate 16 may or may not be bonded to the outer end surface of each partition plate 26 in the vehicle width direction. In some embodiments, the front end surface of each side plate 16 may be flush with the front surface of the partition plate 26F in the unit member 20F constituting the front end portion, as shown in FIG. 7. In some embodiments, the rear end surface of each side plate 16 may be flush with the rear surface of the partition plate 26R in the unit member 20R constituting the rear end portion, as shown in FIG. 7.

The outer frame of the battery case 12 is formed by the side plates 16, the partition plate 26F of the unit member 20F constituting the front end portion, and the partition plate 26R of the unit member 20R constituting the rear end portion. Therefore, the partition plates 26F and 26R can be regarded as "side plates" equivalent to the side plates 16. Each side plate 16 is also formed of the same light metal material such as aluminum alloy as that of the unit member 20.

Further, on the upper surface of the flat plate portion 22 at the center portion in the vehicle width direction, plural (e.g., four) middle plates 18 as rectangular flat partition plates extending in the vehicle body front-rear direction are provided by being bonded by bonding such as arc welding or laser welding in a state in which they are inserted into slit portions 36 of fastening members 30 (to be described later). At this time, the front end surface and the rear end surface of each middle plate 18 may or may not be bonded to the rear surface and the front surface of each partition plate 26, respectively. Each of the middle plates 18 is also formed of the same light metal material such as aluminum alloy as that of the unit member 20.

As shown in FIG. 1, a plurality (e.g., eight) of battery packs 50 formed in a substantially rectangular shape in plan view are accommodated in a plurality (e.g., eight) of regions (compartments) E on the upper surface of the bottom plate 14 and surrounded by the respective side plates 16, the respective partition plates 26, and the respective middle plates 18. In other words, the bottom plate 14, each side plate 16, and each middle plate 18 form a battery case 12 (excluding the top plate 40) on which plural (e.g., eight) battery packs 50 are mounted.

Figure 5:
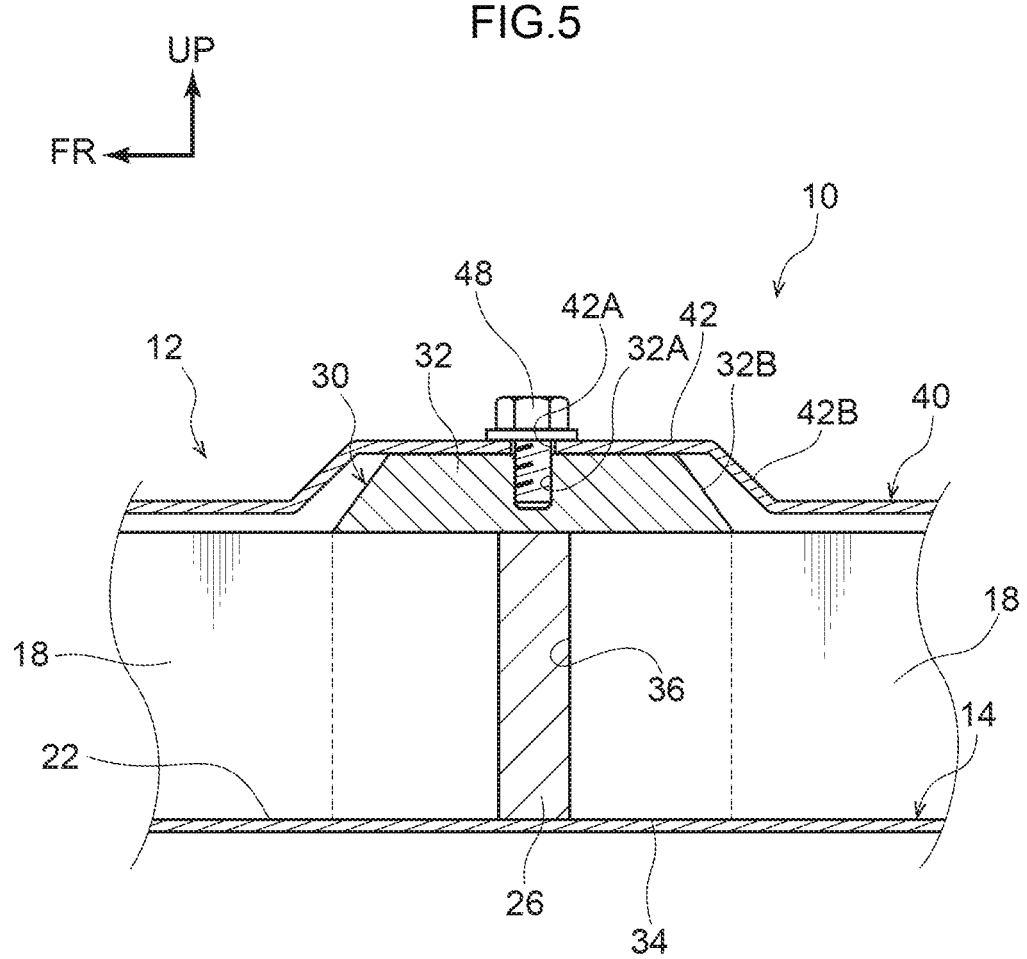
FIG. 5 is a side cross-sectional view showing a fastening member of a battery case structure for a vehicle according to the present embodiment.

As shown in FIGS. 5 and 7, the battery case 12 is closed by covering the rectangular flat top plate 40 after the battery pack 50 (see FIG. 1) is accommodated therein. Next, the fastening structure of the top plate 40 will be described. The top plate 40 is formed of the same light metal material such as aluminum alloy as that of the unit member 20 in a thin plate shape.

As shown in FIGS. 1 and 4 to 6, a fastening member 30 is inserted and provided at an intersecting position between the side plate 16 and the partition plate 26 and at an intersecting position among the partition plate 26 and the middle plate 18. The fastening member 30 is formed in a substantially cylindrical shape from a light metal material such as an aluminum alloy, and the upper wall thereof is a fixing portion 32 having a predetermined thickness to which the top plate 40 is fixed.

The fixing portion 32 of the fastening member 30 is formed in an isosceles trapezoidal shape in a side cross-sectional view shown in FIG. 5, and a tapered surface 32B is formed on an outer peripheral surface thereof. A female screw portion 32A to which a bolt 48 for fastening the top plate 40 to the fastening member 30 is screwed is formed at the center of the upper surface of the fixing portion 32. The female screw portion 32A does not penetrate downward so that the lower end portion of the bolt 48 does not come into contact with the upper surface of the partition plate 26 or the like.

Figure 6:
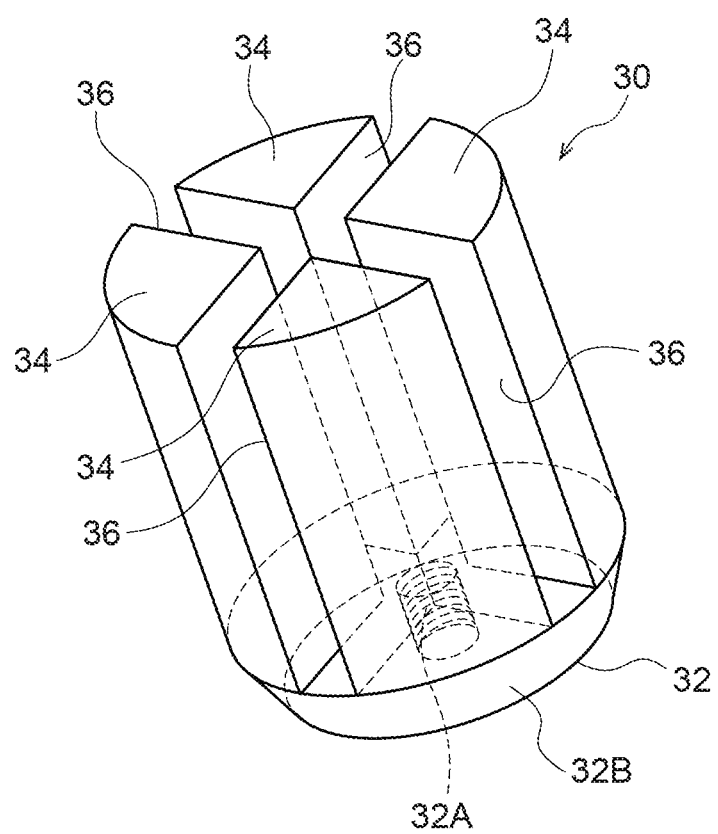
FIG. 6 is a perspective view showing a fastening member of a battery case structure for a vehicle according to the present embodiment, as seen from a lower surface side.

On the other hand, as shown in FIG. 6, the lower wall of the fastening member 30 is a bonding portion 34 bonded to the upper surface of the bottom plate 14, and four slit portions 36 into which the side plate 16, the partition plate 26, and the middle plate 18 can be inserted are formed at equal intervals (at intervals of 90 degrees) on the side wall (side surface) of the fastening member 30. That is, the slit portion 36 is formed by being cut out in a rectangular shape from the lower surface of the fixing portion 32 to the bonding portion 34, and is formed in a cross shape in the bottom view of the fastening member 30.

As shown in FIG. 5, the fastening member 30 is formed to be higher than the heights of the side plate 16, the partition plate 26, and the middle plate 18 by the thickness of the fixing portion 32. In the fastening member 30, in a state in which at least one of the side plate 16 and the partition plate 26 (including the middle plate 18) is inserted into the slit portion 36, the bonding portion 34 is bonded to the upper surface of the bottom plate 14 by bonding such as arc welding or laser welding.

More specifically, as shown in FIG. 1, at the front corner portion where the partition plate 26F and the side plate 16 intersect, the outer end portion of the partition plate 26F in the vehicle width direction and the front end portion of the side plate 16 are inserted into the slit portion 36. At the corner portion on the rear side where the partition plate 26R and the side plate 16 intersect, the outer end portion of the partition plate 26R in the vehicle width direction and the rear end portion of the side plate 16 are inserted into the slit portion 36.

Therefore, in the fastening member 30 disposed at the corner portion, although not shown, two slit portions 36 into which nothing is inserted can be provided, one slit portion 36 on the front side, one slit portion 36 on the outside in the vehicle width direction and one slit portion 36 on the front side, and one slit portion 36 on the rear side, one slit portion 36 on the outside in the vehicle width direction and one slit portion 36 on the rear side. Thus, the fastening portion 30 disposed at the corners may be provided with only two slits 36 formed at 90-degree intervals in advance.

Further, at a portion where the partition plate 26 and the side plate 16 intersect with each other except for the partition plates 26F and 26R, an outer end portion of the partition plate 26 in the vehicle width direction and an intermediate portion of the side plate 16 are inserted into the slit portion 36, respectively. Therefore, in the fastening member 30 disposed at this portion, although not shown, one slit portion 36 into which nothing is inserted can be provided outside in the vehicle width direction. Thus, the fastening portion 30 disposed at this, site may be provided with only three slit portions 36 formed at 90 degree intervals.

Further, at a portion where the partition plate 26F and the middle plate 18 intersect, that is, at the center portion in the vehicle width direction at the front end portion, the intermediate portion of the partition plate 26F and the front end portion of the middle plate 18 are inserted into the slit portion 36. At a portion where the partition plate 26R and the middle plate 18 intersect, that is, at the center in the vehicle width direction at the rear end portion, the intermediate portion of the partition plate 26R and the rear end portion of the middle plate 18 are inserted into the slit portion 36.

Therefore, in the fastening member 30 disposed at this portion, although not shown, one slit portion 36 into which nothing is inserted can be formed on the vehicle body front side and one slit portion 36 on the vehicle body rear side, respectively. Therefore, the fastening member 30 disposed at this position may also use a member in which only three slit portions 36 are formed in advance at intervals of 90 degrees.

At the intersection of the partition plate 26 and the middle plate 18, the intermediate portion of the partition plate 26 and the front end portion of one of the middle plates 18 and the rear end portion of the other of the middle plates 18 are inserted into the slit portion 36. Therefore, in the fastening member 30 disposed at this portion, there is no slit portion 36 into which nothing is inserted.

In addition, as shown in FIGS. 5 and 7, at a position corresponding to the fastening member 30 in the top plate 40, in order to allow the fixing portion 32 to the upper side of the vehicle body, a protruding portion 42 is formed which is recessed to the upper side of the vehicle body in a circular shape having an inner diameter larger than the outer diameter of the fixing portion 32 in plan view.

A through hole 42A having a circular shape in plan view for inserting the bolt 48 is formed at the center of the projecting portion 42, and a tapered surface 42B facing the tapered surface 32B is formed around the projecting portion 42. Except for the projecting portion 42, the bottom surface of the top plate 40 is arranged close to (in non-contact with) the top surfaces of the side plate 16, the partition plate 26, and the middle plate 18 (see FIG. 5).

As shown in FIGS. 1 and 5, the heights of the side plates 16, the partition plates 26, and the middle plates 18 are the same. However, the present disclosure is not limited thereto, and each side plate 16 may be formed slightly higher than each partition plate 26 and each middle plate 18. The heights of the side plates 16, the partition plates 26, and the middle plates 18 are the same as the height of the battery pack 50, but the present disclosure is not limited to this, and may be formed slightly higher than the height of the battery pack 50.

As shown in FIGS. 2 and 3, the reinforcing portion 28 has a front surface 28A inclined toward the front side of the vehicle body as the vehicle body moves upward and a rear surface 28B inclined toward the rear side of the vehicle body as the vehicle body moves upward, in a cross-sectional view seen from the vehicle width direction. That is, the reinforcing portion 28 is formed in a substantially isosceles trapezoidal shape in a cross-sectional view seen from the vehicle width direction. The reinforcing portion 28 is formed in a hollow shape having a through hole 28C having a substantially isosceles trapezoidal shape penetrating in the vehicle width direction.

Further, as shown in FIG. 1, fastening holes 22A for fastening to the lower walls of a pair of right and left rockers (not shown) serving as a vehicle body are formed in the flat plate portion 22 on the outer side of each side plate 16 in the vehicle width direction and directly above the reinforcing portion 28. A floor plate (not shown) is provided between the upper walls of the pair of right and left rockers. As a result, the battery case 12 is disposed between the side walls of the right and left rockers, on the inner side in the vehicle width direction, and on the lower side of the floor plate.

Next, the operation of the vehicle battery case structure 10 according to the present embodiment configured as described above will be described.

As described above, the unit member 20 constituting the bottom plate 14 is formed by extrusion molding. Therefore, even in the unit member 20 in which the partition plate 26 is integrally erected on the upper surface of the flat plate portion 22, the strength and rigidity thereof can be ensured, in particular, the strength and rigidity with respect to the load input from the outside in the vehicle width direction.

Since the partition plate 26 extending in the vehicle width direction is formed integrally with the unit member 20, the strength and rigidity of the partition plate 26 can be improved as compared with the case where the partition plate 26 extending in the vehicle width direction is not formed integrally with the unit member 20 (for example, the case where the partition plate 26 is separately bonded to the unit member 20). Therefore, the strength and rigidity of the bottom plate 14 formed by connecting the plurality of unit members 20 to each other can be ensured.

In addition, when the bonding portions 24 of the unit members 20 are bonded by friction stir welding (FSW), the bottom plate 14 can be manufactured with high dimensional accuracy. That is, the friction stir welding (FSW) can be performed at a temperature lower than the melting point of the unit member 20 (a light metal material such as an aluminum alloy), so that distortion and residual stress are small. Therefore, warpage or twist is less likely to occur in the bottom plate 14 after bonding, and the dimensional accuracy thereof can be ensured with high accuracy.

As described above, the bottom plate 14 is provided with plural fastening members 30 for attaching the top plate 40. That is, the fastening member 30 is bonded to the upper surface of the bottom plate 14 at the intersecting position between the side plate 16 and the partition plate 26 (including the partition plates 26F and 26R) and at the intersecting position between the middle plate 18 and the partition plates 26 (including the partition plates 26F and 26R) (at the intersecting position among the partition plates), in a state in which at least one of the side plate 16 and the partition plate 26 (including the middle plate 18) is inserted into the slit portion 36, at the bonding portion 34.

More specifically, in a state in which the side plate 16 and the middle plate 18 are positioned with respect to the partition plate 26 by the fastening member 30, the bonding portion 34 of the fastening member 30, the lower surface of the side plate 16, and the lower surface of the middle plate 18 are bonded to the upper surface of the bottom plate 14, respectively, by arc welding or the like. That is, the fastening member 30 is not provided at the intersecting position of the lower surface of the side plate 16 and the lower surface of the middle plate 18 in a state where they are bonded to the upper surface of the bottom plate 14 in advance by arc welding or the like.

Therefore, as compared with the ease where the fastening member 30 is provided in a state in which the lower surface of the side plate 16 and the lower surface of the middle plate 18 are bonded to the upper surface of the bottom plate 14 in advance by arc welding or the like, the side plate 16 and the middle plate 18 can be positioned with respect to the partition plate 26 by the fastening member 30, and as a result, the fastening member 30 can be positioned with respect to the partition plate 26, the side plate 16, and the middle plate 18.

Therefore, the positional deviation of the fastening member 30 when attaching the top plate 40 can be suppressed or prevented. Since the fastening member 30 can be positioned perpendicularly to the upper surface of the bottom plate 14 and bonded, the warping and twisting of the partition plate 26, the side plate 16, and the middle plate 18 can be corrected by the fastening member 30.

Incidentally, the side plate 16 and the middle plate 18 before being bonded are provisionally held on the upper surface of the bottom plate 14 by a jig or the like (not shown) so that the position thereof can be finely adjusted. Therefore, the position of the side plate 16 and the middle plate 18 with respect to the partition plate 26 can be finely adjusted by the fastening member 30. In addition, the side plate 16 and the middle plate 18 are not limited to the configuration of being temporarily held by a jig or the like (not shown), and may be configured to be temporarily bonded to the upper surface of the bottom plate 14 by, for example, double-sided tape or the like.

Battery packs 50 are accommodated in regions E on the upper surface of the bottom plate 14 to which the fastening member 30 is bonded and partitioned by the side plate 16, the partition plate 26, and the middle plate 18, respectively. A top plate 40 is placed on the bottom plate 14 in which plural battery packs 50, eight in this case, are accommodated. At this time, the projecting portions 42 formed on the top plate 40 are arranged on the fixing portions 32 of the fastening members 30.

That is, the through hole 42A formed in each projecting portion 42 and the female screw portion 32A formed in each fixing portion 32 communicate with each other. In this state, the bolt 48 is inserted into the through hole 42A from the upper side of the vehicle body and screwed into the female screw portion 32A. Thereby, the top plate 40 is fixed to the fastening member 30 (the bottom plate 14), and the battery case 12 in which the battery pack 50 is accommodated is manufactured. The battery case 12 is bridged between the side walls of the pair of right and left rockers.

The side plate 16, the partition plate 26, and the middle plate 18 inserted into the slit portion 36 may be bonded to the peripheral portion of the slit portion 36 by arc welding or the like. According to this, it is possible to further correct the warpage and twist of the side plate 16, the partition plate 26, and the middle plate 18 on the upper surface of the bottom plate 14, as compared with the case where the side plate 16, the partition plate 26, and the middle plate 18 inserted into the slit portion 36 are not bonded to the peripheral portion of the slit portion 36, respectively.

As described above, together with the bonding portion 34 of the fastening member 30, the lower surfaces of the pair of left and right side plates 16 are bonded to the upper surface of the bottom plate 14 on the outer side in the vehicle width direction of each partition plate 26 by arc welding or the like. The bottom surfaces of the plurality of middle plates 18 extending in the vehicle body front-rear direction are bonded to the top surface of the bottom plate 14 and the center portion in the vehicle width direction by arc welding or the like.

In other words, the side plate 16 and the middle plate 18 are bonded to the upper surface of the bottom plate 14 with the strength and rigidity secured. Therefore, in the battery case 12 in which the top plate 40 is fastened to the bottom plate 14 via the fastening member 30, it is possible to suppress or prevent the occurrence of warpage or twist, and it is possible to secure the product accuracy of the battery case 12.

In addition, since the fastening members 30 disposed at the respective portions can be used in common, only one type of mold is required for manufacturing the fastening members 30. Therefore, the manufacturing cost of the fastening member 30 can be reduced as compared with the case where fastening members (not shown) having different numbers of slit portions 36 are used according to the respective portions.

Further, since the bottom plate 14 is manufactured by combining plural unit members 20, it is possible to flexibly cope with changes in the number of battery packs 50 to be mounted. In other words, the number of unit members 20 coupled to each other is determined according to the number of battery packs 50 to be mounted, and the size of the bottom plate 14 is determined.

For example, when eight battery packs 50 are mounted, as shown in FIGS. 1 and 7, three unit members 20 are disposed between the unit member 20F constituting the front end portion and the unit member 20R constituting the rear end portion, and eight regions E are formed by the five partition plates 26, the two side plates 16, and the four middle plates 18.

Figure 8:
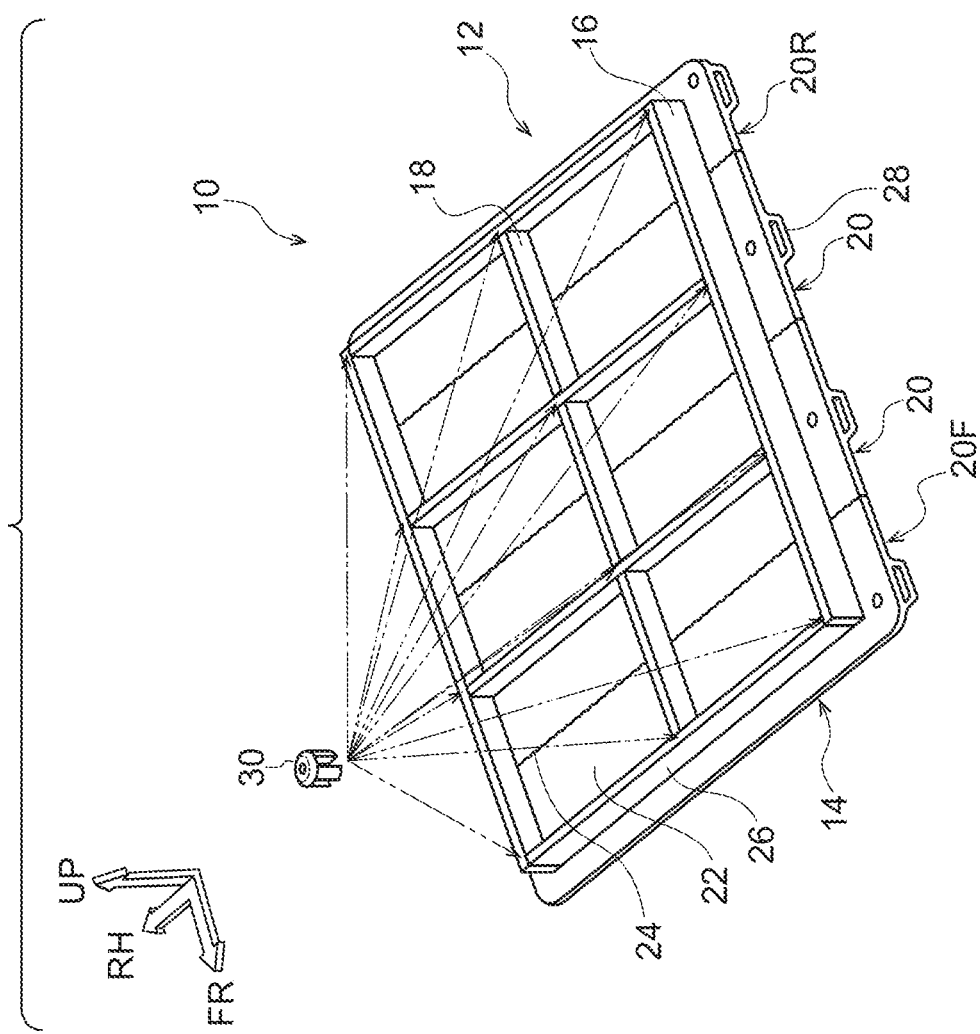
FIG. 8 is a perspective view showing a first modification of the vehicle battery case structure according to the present embodiment.

When six battery packs 50 are mounted, as shown in FIG. 8, two unit members 20 are disposed between the unit member 20F constituting the front end portion and the unit member 20R constituting the rear end portion, and six regions F are formed by the four partition plates 26, the two side plates 16, and the three middle plates 18.

Figure 9:
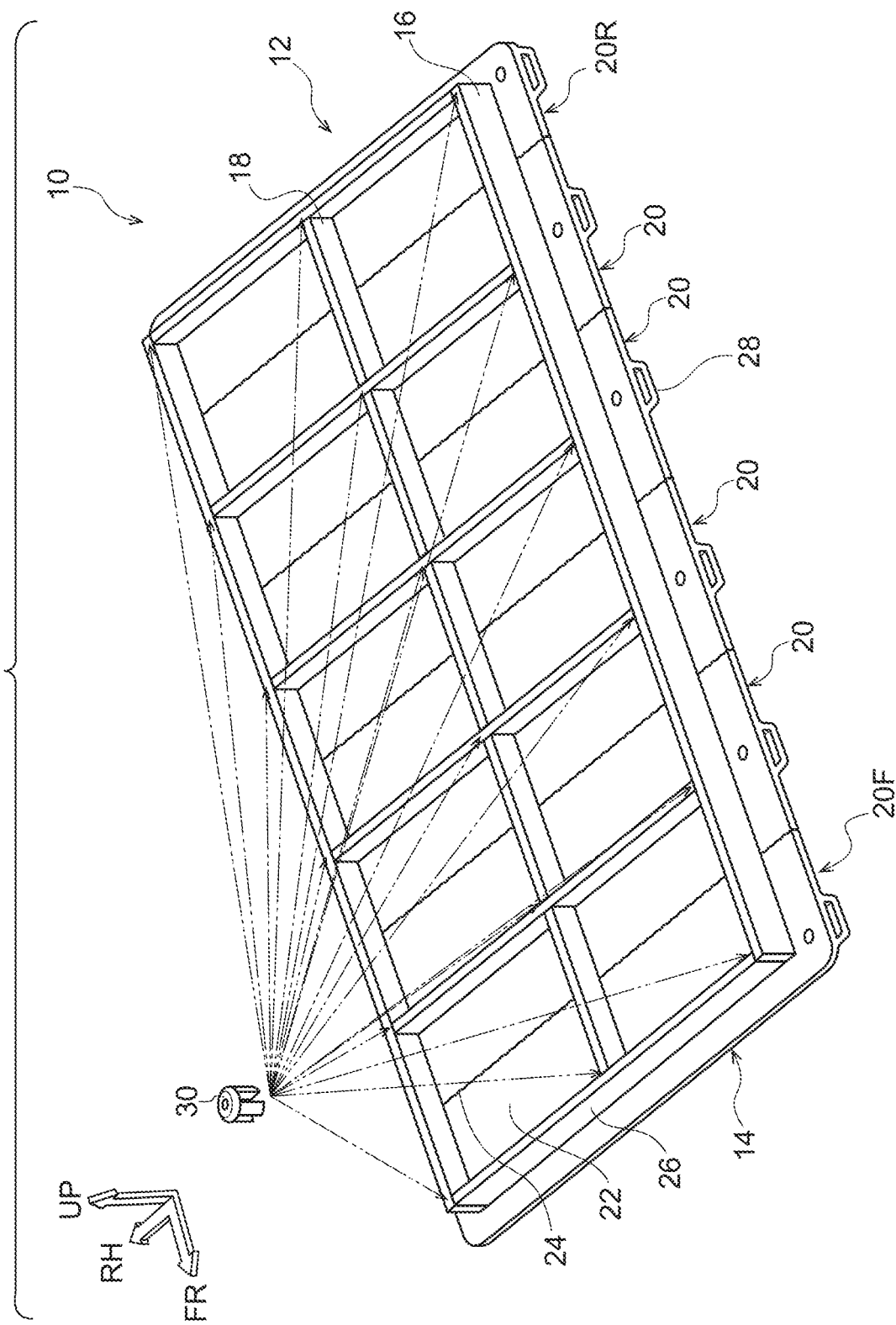
FIG. 9 is a perspective view showing a second modification of the vehicle battery case structure according to the present embodiment.

Further, when 10 battery packs 50 are mounted, as shown in FIG. 9, four unit members 20 are disposed between the unit member 20F constituting the front end portion and the unit member 20R constituting the rear end portion, and 10 areas E are formed by the six partition plates 26, the two side plates 16, and the five middle plates 18.

As described above, in the vehicle battery ease structure 10 according to the present embodiment, the size of the bottom plate 14 can be changed by changing the number of the unit members 20. In other words, the size of the bottom plate 14 can be changed according to the number of the battery packs 50 to be mounted. Therefore, in the battery case 12, the degree of freedom with respect to the mounting amount of the battery pack 50 can be increased.

When the battery pack 50 has a rectangular shape long in the vehicle width direction, the middle plate 18 may not be provided. As described above, according to the vehicle battery case structure 10 of the present embodiment, even if the length of the battery pack 50 in the vehicle width direction changes, the battery pack 50 can be flexibly accommodated and can be accommodated.

Figure 10:
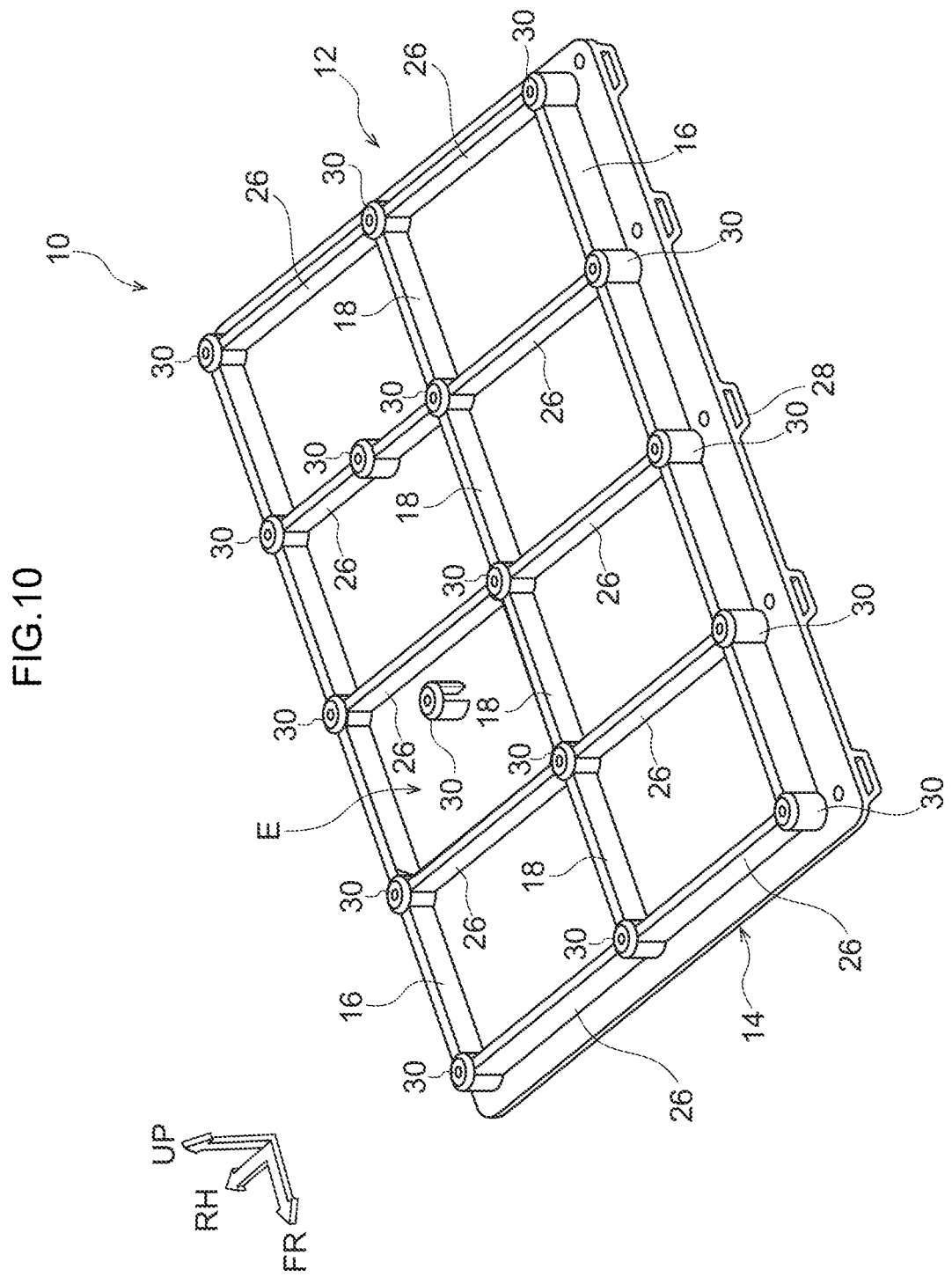
FIG. 10 is a perspective view showing a third modification of the vehicle battery case structure according to the present embodiment.
Figure 11:
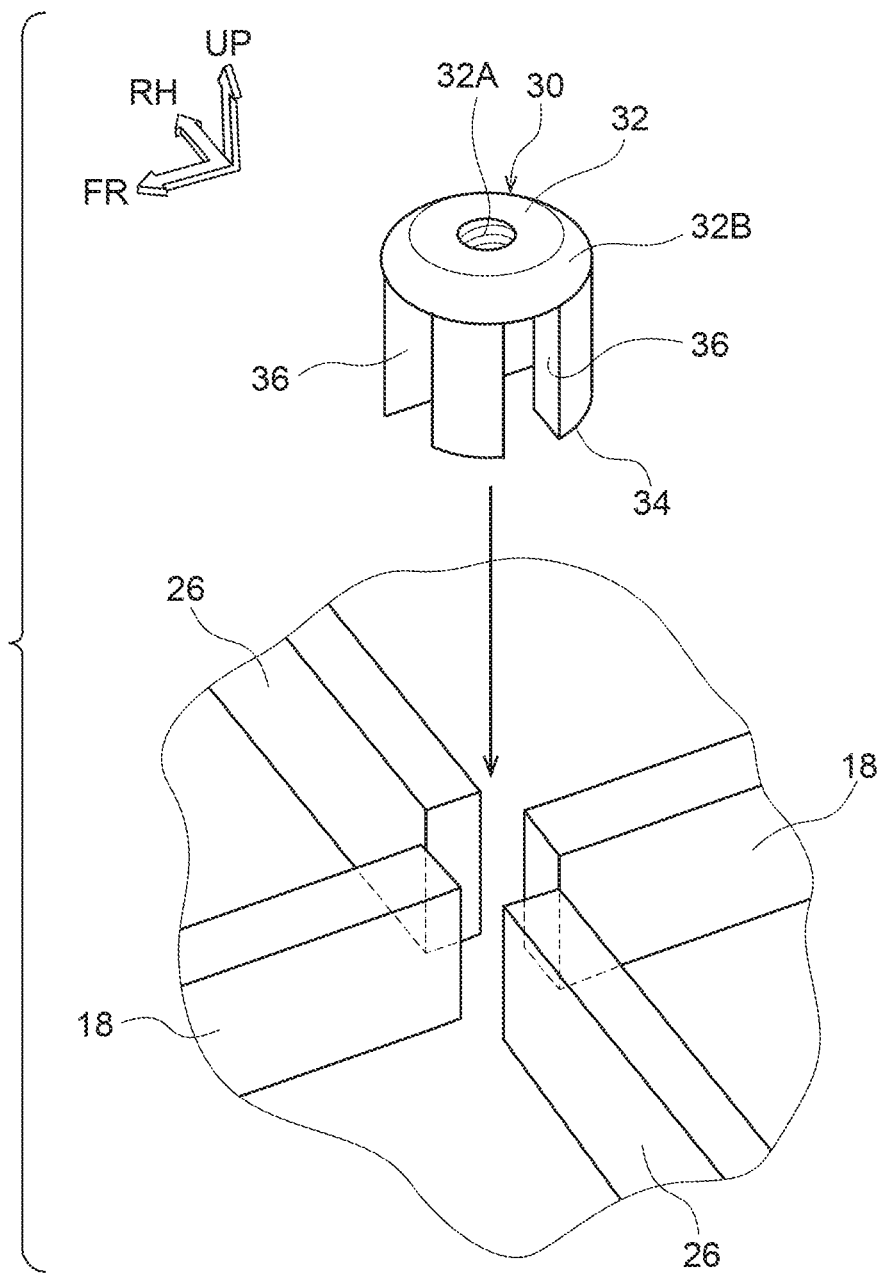
FIG. 11 is an enlarged perspective view showing a configuration of a part of a third modification of the battery case structure for a vehicle according to the present embodiment.

The bottom plate 14 is not limited to a structure in which plural unit members 20 are coupled to each other. For example, as shown in FIG. 10, the bottom plate 14 may be formed in a rectangular flat plate shape having a predetermined size with a flat top surface. As shown in FIG. 11 (only the middle plate 18 and the partition plate 26 are shown in FIG. 11), not only the side plate 16 and the middle plate 18 but also the partition plate 26 extending in the vehicle width direction may be bonded to the upper surface of the bottom plate 14 by bonding such as arc welding.

In this case, in a state in which the side plate 16, the middle plate 18, and the partition plate 26 are positioned by the fastening member 30, the bonding portion 34 of the fastening member 30, the lower surface of the side plate 16, the lower surface of the middle plate 18, and the lower surface of the partition plate 26 are bonded to the upper surface of the bottom plate 14, respectively, by arc welding or the like. Therefore, as compared with the case where the fastening member 30 is provided in a state in which the lower surface of the side plate 16, the lower surface of the middle plate 18, and the lower surface of the partition plate 26 are bonded to the upper strike of the bottom plate 14 in advance by are welding or the like, the side plate 16, the middle plate 18, and the partition plate 26 can be positioned by the fastening member 30, and as a result, the fastening member 30 can be positioned with respect to the side plate 16, the middle plate 18, and the partition plate 26.

Therefore, the positional deviation of the fastening member 30 when attaching the top plate 40 can be suppressed or prevented. Since the fastening member 30 can be positioned perpendicularly to the upper surface of the bottom plate 14 and bonded, warpage and twist of the side plate 16, the middle plate 18, and the partition plate 26 can be corrected by the fastening member 30.

In addition, in such a mode or in the case where the plate thickness of the top plate 40 is formed thinner (the rigidity of the top plate 40 is reduced), not only the intersecting position of the middle plate 18 and the partition plate 26 but also the intermediate portion of the partition plate 26 in the vehicle width direction may be provided, with the fastening member 30 (the bonding portion 34 is bonded to the upper surface of the bottom plate 14) as shown in FIG. 10, for example.

According to this, since the bonding strength of the partition plate 26 bonded to the upper surface of the bottom plate 14 in the intermediate portion in the vehicle width direction is improved by arc welding or the like, warpage and twist of the partition plate 26 can be further corrected. Since the fastening portion of the top plate 40 to the bottom plate 14 can be increased, it is possible to suppress the rigidity reduction of the top plate 40.

Further, as shown in FIG. 10, when not the battery pack 50 but the accessories and the like (not shown) are accommodated in one of the plurality of regions E, the fastening member 30 may be provided on the upper surface of the bottom plate 14 in the region E (the bonding portion 34 may be bonded to the upper surface of the bottom plate 14). With such a configuration, similarly to the above, since the fastening portion of the top plate 40 to the bottom plate 14 can be increased, it is possible to suppress the rigidity reduction of the top plate 40.

Figure 12:
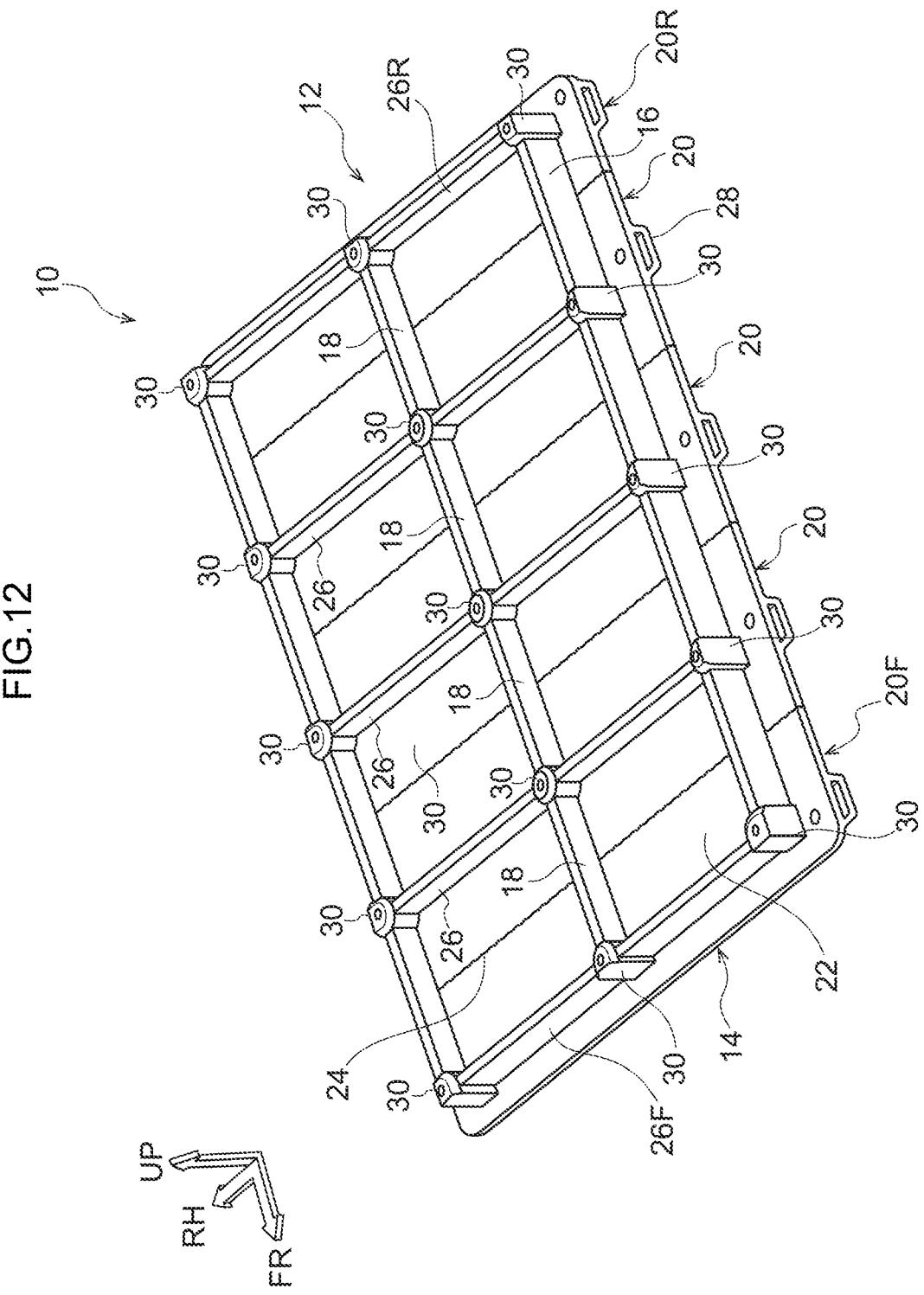
FIG. 12 is a perspective view showing a fourth modification of the battery case structure for a vehicle according to the present embodiment.
Figure 13A:
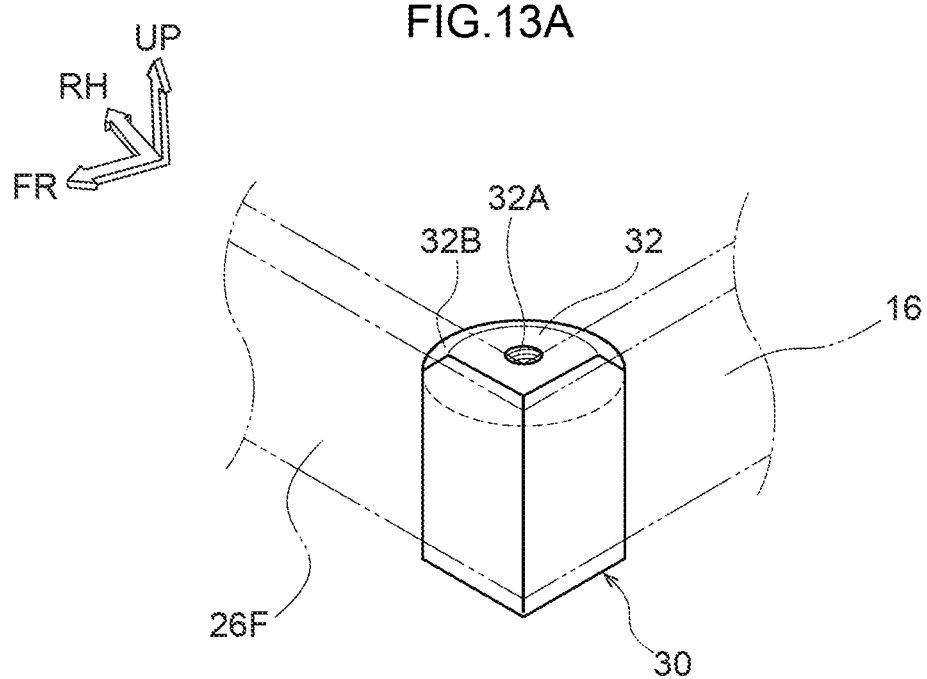
FIG. 13A is a magnified perspective view of a part of a fourth modification of the battery case structure for a vehicle according to the present embodiment.
Figure 13B:
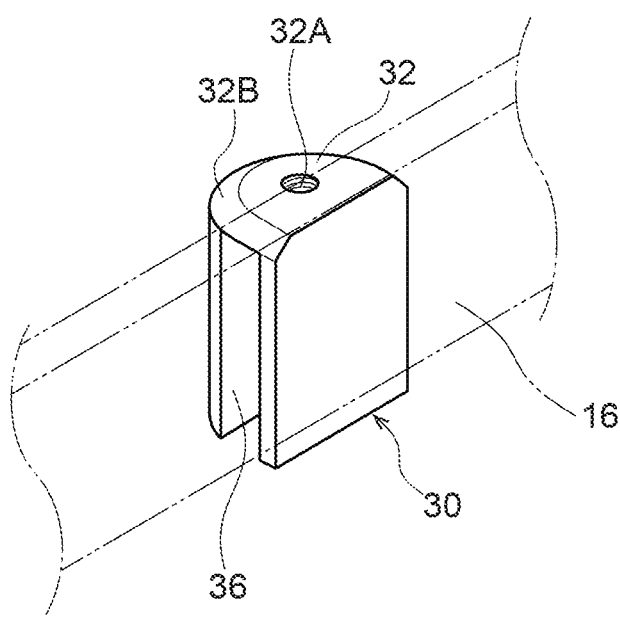
FIG. 13B is a magnified perspective view illustrating a portion of a fourth modification of a battery case structure for a vehicle according to the present embodiment is enlarged.

As shown in FIG. 12 and FIG. 13(A), the fastening member 30 provided at the corner portion may be a flat surface in which the slit portion 36 is not formed between the side surface on the outer side in the vehicle width direction and the side surface on the front side of the vehicle body or the side surface on the rear side of the vehicle body. As shown in FIG. 12 and FIG. 13B, the fastening member 30 provided at an intermediate portion of the side plate 16 may have a flat surface on the outer side in the vehicle width direction in which the slit portion 36 is not formed.

Similarly, in the fastening member 30 provided in the intermediate portion of the partition plates 26F and 26R, the side surface on the vehicle body front side or the vehicle body rear side may be a flat surface on which the slit portion 36 is not formed. With such a configuration, entry of rainwater, foreign matter, or the like into the slit portion 36 can be prevented as compared with the ease where the slit portion 36 is present in which the side plate 16 or the partition plate 26 is not inserted.

Figure 14A:
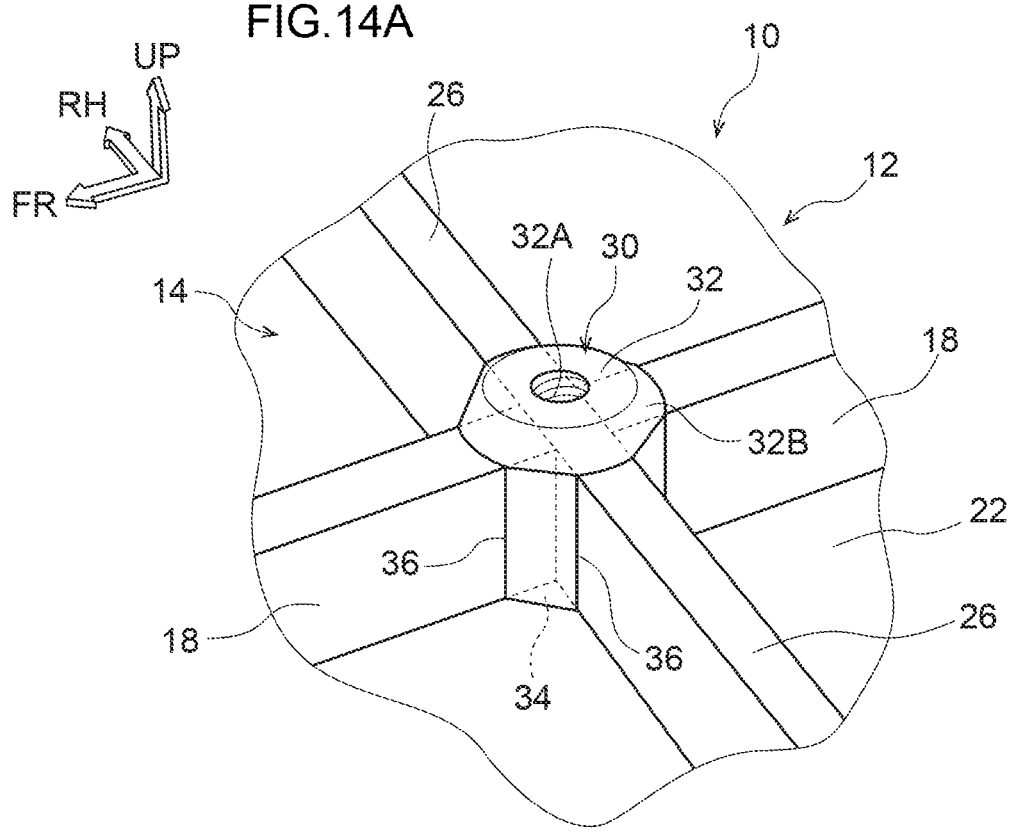
FIG. 14A is a magnified perspective view of a part of a fifth modification of the battery case structure for a vehicle according to the present embodiment.

The fastening member 30 is not limited to a configuration formed in a generally cylindrical shape. For example, as shown in FIG. 14A, the fastening member 30 may be formed in a substantially rectangular prism shape having a substantially square shape in plan view. According to this, it is possible to suppress or prevent the corner portions of the battery pack 50 from interfering with the side surface of the fastening member 30.

Figure 14B:
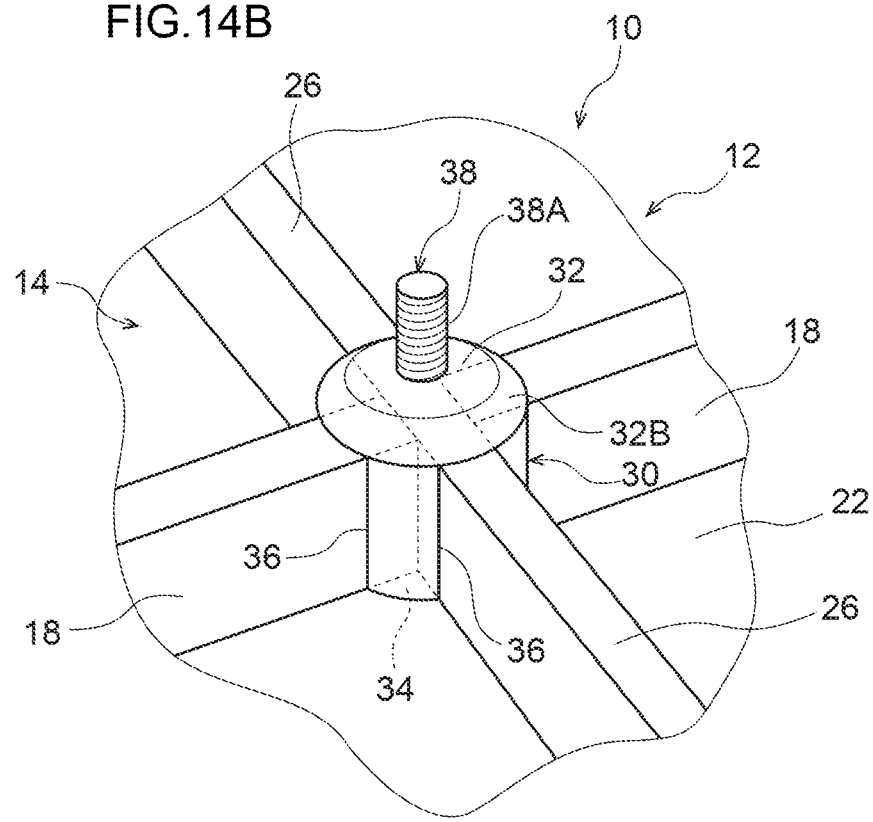
FIG. 14B is a magnified perspective view illustrating a portion of the sixth modification of the battery case structure for a vehicle according to the present embodiment is enlarged.

As shown in FIG. 14B, a stud bolt 38 may be provided in the fixing portion 32 of the fastening member 30. That is, one shaft portion (not shown) of the stud bolt 38 may be screwed and attached to the female screw portion 32A of the fixing portion 32 to project the other shaft portion 38A of the stud bolt 38 upward.

In this case, the other shaft portion 38A of the stud bolt 38 is inserted into the through hole 42A formed in the protruding portion 42 of the top plate 40, and a nut (not shown) is screwed into the inserted shaft portion 38A, whereby the top plate 40 is fastened to the bottom plate 14 via the fastening member 30.

As described above, at least the lower surface side of the bonding portion 24 of each unit member 20 is bonded by friction stir welding or the like. Therefore, even if the battery case 12 in which the plurality of battery packs 50 are accommodated is disposed between the side walls of the pair of right and left rockers (inside in the vehicle width direction) and below the floor plate, it is possible to suppress or prevent the entry of rainwater, foreign matter, or the like from at least the lower surface of the bonding portion 24.

A reinforcing portion 28 is formed on the lower surface of the flat plate portion 22 (bottom plate 14) on the opposite side to the partition plate 26. Therefore, the strength and rigidity of the bottom plate 14 can be improved by the reinforcing portion 28. Further, the reinforcing portion 28 has a front surface 28A inclined toward the vehicle body front side as the vehicle body moves upward and a rear surface 28B inclined toward the vehicle body rear side as the vehicle body moves upward, in a cross-sectional view seen from the vehicle width direction.

Therefore, even if the stone or the like existing on the road surface hits the front surface 28A or the rear surface 28B of the reinforcing portion 28 during the running of the vehicle (including not only the case of the forward movement but also the case of the reverse movement), the stone or the like is not caught by the reinforcing portion 28. In other words, even if a stone or the like hits the front surface 28A or the rear surface 28B of the reinforcing portion 28, the stone or the like can be easily overcome. Accordingly, it is possible to suppress or prevent breakage of the reinforcing portion 28.

The reinforcing portion 28 is formed in a hollow shape having a through hole 28C penetrating in the vehicle width direction. Therefore, it is possible to suppress or prevent an increase in weight of the bottom plate 14 as compared with the case where the reinforcing portion 28 is formed in a solid shape. Therefore, the weight of the battery case 12 can be reduced.

Although the battery case structure 10 for vehicles according to the present embodiment has been described based on the drawings, the battery case structure 10 for vehicles according to the present embodiment is not limited to those shown, and can be appropriately designed and modified within the scope that does not deviate front the gist of the present disclosure. For example, although not shown in the drawing, the side surface of the fastening member 30 may be formed in such a shape as to be recessed in an arc shape toward the female screw portion 32A in plan view.

Further, in the fastening member 30, instead of forming the female screw portion 32A on the upper portion of the fixing portion 32, for example, a concave portion (not shown) into which a nut (not shown) can be fitted may be formed on the upper portion of the fixing portion 32, the nut may be fitted into the concave portion, and the peripheral edge portion of the nut may be fixed to the fixing portion 32 by arc welding or the like.

In addition, the fastening member 30 is not limited to a configuration in which it is bonded to the upper surface of the bottom plate 14 by arc welding or the like, and may be a configuration in which it is bonded to the upper surface of the bottom plate 14 by, for example, an adhesive or the like. Also, the side plate 16 and the middle plate 18 are not limited to the structure in which they are bonded to the upper surface of the bottom plate 14 by a bonding such as are welding, and may be bonded to the upper surface of the bottom plate 14 by a bonding such as, for example, an adhesive, a bolt, or a nut.

What is claimed is:

1. A battery case structure for a vehicle comprising:
   a top plate;
   a bottom plate;
   a side plate provided around the bottom plate;
   partition plates provided in a lattice pattern on an upper surface of the bottom plate and forming, with the side plate, a plurality of regions for accommodating a battery pack; and
   a fastening member having a slit portion into which the side plate and the partition plate are configured to be inserted and a fixing portion to which the top plate is fixed, and being bonded to an upper surface of the bottom plate at an intersecting position between the side plate and the partition plate and at an intersecting position among the partition plates in a state in which at least one of the side plate and the partition plate is inserted into the slit portion.

2. The vehicle battery case structure according to claim 1, wherein the side plate and the partition plate inserted into the slit portion are respectively bonded to the slit portion.

3. The battery case structure for a vehicle according to claim 1, wherein the bottom plate comprises a plurality of unit members, each of the plurality of unit members extend in a vehicle width direction and, the plurality of unit members being arranged in a vehicle body front-rear direction, each unit member having a bonding portion in which one end portion and the other end portion of a mutually facing bonding portions are bonded to each other.

4. The battery case structure for a vehicle according to claim 2, wherein the bottom plate comprises a plurality of unit members, each of the plurality of unit members extend in a vehicle width direction and, the plurality of unit members being arranged in a vehicle body front-rear direction, each unit member having a bonding portion in which one end portion and the other end portion of a mutually facing bonding portions are bonded to each other.

5. The vehicle battery case structure according to claim 3, wherein the partition plate extending in the vehicle width direction is formed integrally with the unit member.

6. The vehicle battery case structure according to claim 3, wherein a reinforcing portion extending in the vehicle width direction is formed on a lower surface of the unit member.

7. The battery case structure according to claim 3, wherein the mutually facing bonding portions of the unit members are each formed in a staircase shape, such that the staircase shapes of mutually facing bonding portions are arranged symmetrically in a vertical direction.

8. The battery case structure for a vehicle according to claim 1, wherein the fastening member in which the side plate is inserted into the slit portion includes a flat surface in which the slit portion is not formed on a side surface in which the side plate or the partition plate is not inserted.

9. The battery case structure for a vehicle according to claim 2, wherein the fastening member in which the side plate is inserted into the slit portion includes a flat surface in which the slit portion is not formed on a side surface in which the side plate or the partition plate is not inserted.

10. The battery case structure for a vehicle according to claim 3, wherein the fastening member in which the side plate is inserted into the slit portion includes a flat surface in which the slit portion is not formed on a side surface in which the side plate or the partition plate is not inserted.

11. The battery case structure for a vehicle according to claim 1, further comprising a second fastening member inserted into an intermediate portion of the partition plate in a vehicle width direction.

12. The battery case structure for a vehicle according to claim 2, further comprising a second fastening member inserted into an intermediate portion of the partition plate in a vehicle width direction.

13. The battery case structure for a vehicle according to claim 3, further comprising a second fastening member inserted into an intermediate portion of the partition plate in the vehicle width direction.

14. The vehicle battery case structure according to claim 1, further comprising a third fastening member provided on the upper surface of the bottom plate in a region in which the battery pack is not accommodated in the region formed by the side plate and the partition plate.

15. The vehicle battery case structure according to claim 2, further comprising a third fastening member provided on the upper surface of the bottom plate in a region in which the battery pack is not accommodated in the region formed by the side plate and the partition plate.

16. The vehicle battery case structure according to claim 3, further comprising a third fastening member provided on the upper surface of the bottom plate in a region in which the battery pack is not accommodated in the region formed by the side plate and the partition plate.

\* \* \* \* \*